United States Patent
Zhang et al.

(10) Patent No.: US 11,926,716 B2
(45) Date of Patent: Mar. 12, 2024

(54) MULTIFUNCTIONAL SMART PARTICLES

(71) Applicant: SYNMATTER LLC, Orlando, FL (US)

(72) Inventors: Xuenjun Zhang, Orlando, FL (US); Benjamin Pearman, Merritt Island, FL (US)

(73) Assignee: SynMatter LLC, Orlando, FL (US)

( * ) Notice: Subject to any disclaimer, the term of this patent is extended or adjusted under 35 U.S.C. 154(b) by 34 days.

(21) Appl. No.: 17/272,029

(22) PCT Filed: Feb. 10, 2021

(86) PCT No.: PCT/US2021/017362
§ 371 (c)(1),
(2) Date: Feb. 26, 2021

(87) PCT Pub. No.: WO2021/163120
PCT Pub. Date: Aug. 19, 2021

(65) Prior Publication Data
US 2023/0120425 A1   Apr. 20, 2023

Related U.S. Application Data

(60) Provisional application No. 62/972,472, filed on Feb. 10, 2020.

(51) Int. Cl.
| | |
|---|---|
| *C09D 5/00* | (2006.01) |
| *B82Y 30/00* | (2011.01) |
| *C08J 3/12* | (2006.01) |
| *C09D 5/08* | (2006.01) |
| *C09D 5/14* | (2006.01) |

(52) U.S. Cl.
CPC .............. *C08J 3/128* (2013.01); *B82Y 30/00* (2013.01); *C09D 5/082* (2013.01); *C09D 5/14* (2013.01)

(58) Field of Classification Search
CPC .................. C09D 5/14; C09D 5/082
See application file for complete search history.

(56) References Cited

U.S. PATENT DOCUMENTS

| | | | |
|---|---|---|---|
| 7,790,225 B1 | 9/2010 | Calle et al. | |
| 9,605,162 B2 | 3/2017 | Fitz et al. | |
| 10,265,693 B2 | 4/2019 | Hatakeyama et al. | |
| 10,767,058 B1* | 9/2020 | Zhang | C09D 7/45 |
| 2007/0053950 A1 | 3/2007 | Gajanan et al. | |
| 2011/0048275 A1* | 3/2011 | Fletcher | C09C 3/08 |
| | | | 106/14.44 |
| 2014/0271757 A1* | 9/2014 | Agrawal | C09D 5/14 |
| | | | 507/90 |
| 2019/0048223 A1 | 2/2019 | Dustin et al. | |

FOREIGN PATENT DOCUMENTS

| | | |
|---|---|---|
| CN | 104927418 A | 9/2015 |
| CN | 104927583 A | 9/2015 |
| CN | 105121480 A | 12/2015 |
| CN | 105970192 A | 9/2016 |
| CN | 106928806 A | 7/2017 |
| CN | 107474615 A | 12/2017 |
| KR | 20090032014 A | 3/2009 |
| WO | 2019173905 A1 | 9/2019 |

OTHER PUBLICATIONS

American Coatings Association, Coatings Technologies Bring NASA Solutions Down to Earth, Coatings Tech, Jan. 2019, vol. 16, No. 1, https://www.paint.org/coatingstech-magazine/articles/coatings-technologies-bring-nasa-solutions-down-to-earth/, New York, NY.
Calle, Luz Marina, Smart Coatings for Corrosion Protection, National Aeronautics and Space Administration, Nov. 14-18, 2016, Mexico.
Huang et al., Triple-Action Self-Healing Protective Coatings Based on Shape Memory Polymers Containing Dual-Function Microspheres, ACS Appl. Mater. Interfaces 2018, 10, 23369-23379, Washington, DC.
Li et al., Smart coating for corrosion indication and prevention recent progress, Paper presented at the CORROSION 2009, Atlanta, Georgia, Mar. 2009, Paper No. NACE-09499.
Li, et al., Microencapsulation Technologies for Corrosion Protective Coating Applications, https://ntrs.nasa.gov/search.jsp?R=20150023109 2019-10-26T21:16:43+00:00Z, NASA, Kennedy Space Center, FL.
Li, et al., Preparation and characterization of pH-controlled-release intelligent corrosion inhibitor, Materials Letters Feb. 2014DOI: 10.1016/j.matlet.2013.11.003, The Netherlands.
Makhlouf et al., editors, Handbook of Nanoceramic and Nanocomposite Coatings and Materials, 2015, pp. 534-549, Elsevier Ltd., Waltham, MA.
Pearman, Benjamin, Characterization of Corrosion Inhibitor Containing Microparticles for Environmentally Friendly Smart Coatings sheet, John F. Kennedy Space Center: Corrosion Technology Laboratory, 2014, Nasa, FL.
Pearman, et al., Characterization of Encapsulated Corrosion Inhibitors for Environmentally Friendly Smart Coatings, 2015, NASA, Kennedy Space Center, FL.
Pearman, et al., Release properties and electrochemical characterization of encapsulated corrosion inhibitors for environmentally friendly smart coatings, 2015, NASA, Kennedy Space Center, FL.
Qian, et al., Dual-action smart coatings with a self-healing superhydrophobic surface and anti-corrosion properties, J. Mater. Chem. A, 2017, 5, 2355-2364, London, UK.
Tian, et al., An Intelligent Corrosion Inhibitor Based on pH sensitive poly(2-diethylaminoethyl methacrylate) Microspheres, Int. J. Electrochem. Sci., 14 (2019) 8506-8513, Serbia.

(Continued)

*Primary Examiner* — Austin Murata

(57) ABSTRACT

The present invention provides multifunctional particulates that release one or more functional compounds in response to environmental triggers and whose external surface modification imparts secondary functionalities to a selected coating composition. For example, disclosed are hydrophobic particles having a smart release mechanism for anticorrosion compounds that release the anticorrosion compounds upon exposure to the local pH changes induced by corrosion processes. Formulations are disclosed for multifunctional smart particles having antimicrobial effects and protections as well.

19 Claims, 1 Drawing Sheet

(56) References Cited

OTHER PUBLICATIONS

Wei, et al., Advanced micro/nanocapsules for self-healing smart anticorrosion coatings, J. Mater. Chem. A, 2015, 3,469, Royal Society of Chemistry, London, UK.
Yeganah, et al., Methods for corrosion protection of metals at the nanoscale, May 2019, Research Gate, DOI: 10.31872/2019/KJNN-100123, Berlin, Germany.

* cited by examiner

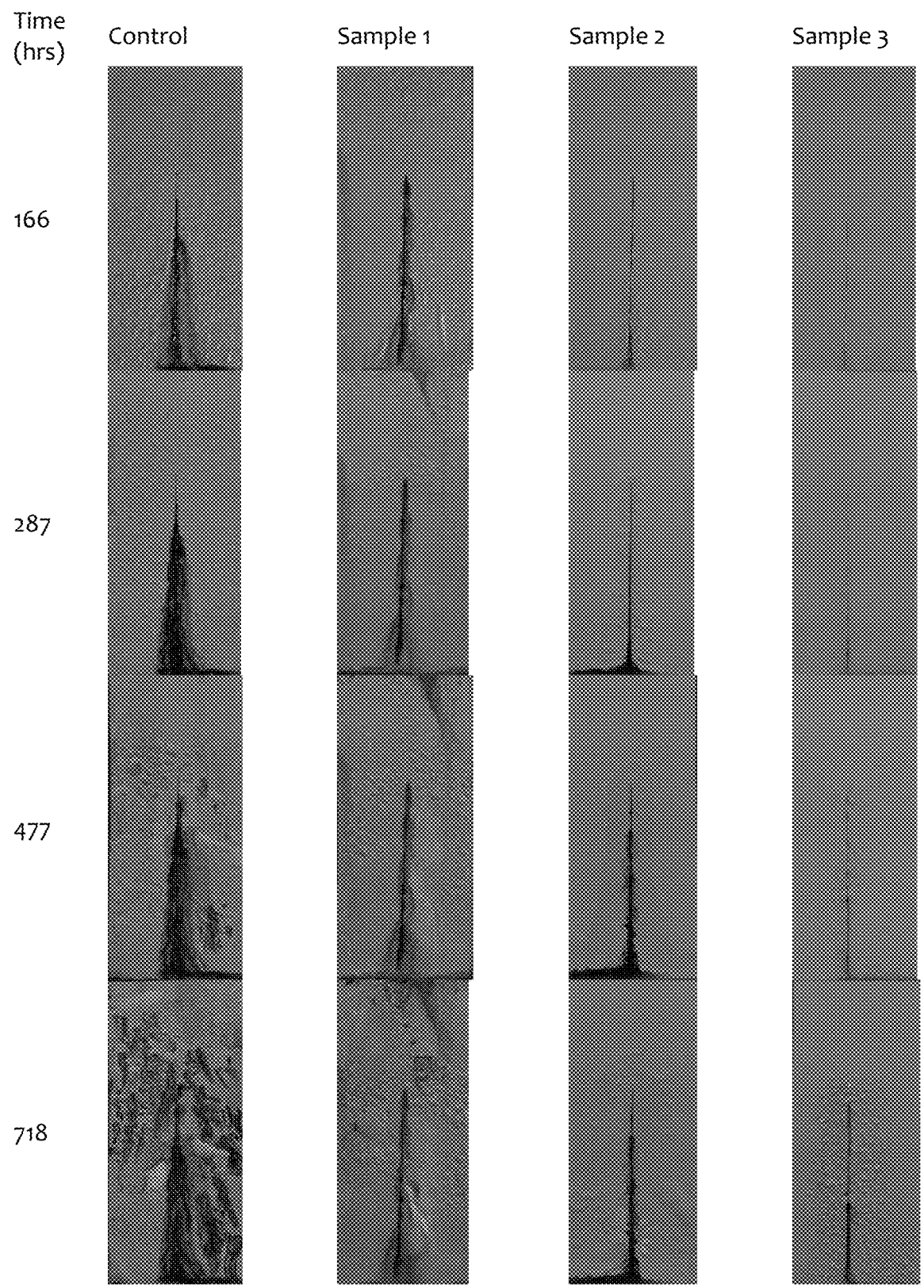

MULTIFUNCTIONAL SMART PARTICLES

FIELD OF THE INVENTION

The invention relates to solid particulate additives to a coating composition.

BACKGROUND OF THE INVENTION

The application of functional materials has been extensively propagated to many industry fields such as coatings, cosmetic products, sensors and detective materials, medicines, and others. One of the most important areas of research in the wide range of functional materials is in the development of functional ingredients, which refers to the highly effective add-on functionality on existing systems.

Some functional materials are referred to "smart" materials due to their ability to respond to a preselected stimulus from their immediate environment. One of the most exciting areas of smart materials is development of materials with controlled release functions. These smart materials can intelligently respond to the environment for long lasting function to the main structure. These smart particles that carry active agents have the potential to dramatically improve the performance of the original fluids or coatings that carry the smart particles. See Ulaeto et al., "Developments in smart anticorrosive coatings with multifunctional characteristics", Progress in Organic Coatings, Vol 111, Pages 294-314 (October 2017) whose abstract is available online at
https://www.sciencedirect.com/science/article/pii/
S0300944016310839 (accessed 22 Jan. 2021).

NASA has disclosed that the corrosion protection efficiency of a coating can be significantly improved by incorporation of corrosion inhibitors in a pH-sensitive microcapsule. These microencapsulated materials are incorporated into coatings to imbue the coatings with on-demand anticorrosive properties when the localized basic pH conditions trigger the release of inhibitors from the microcapsules. The inhibitors move to the corrosion site where they form a protective layer, preventing any further significant corrosion from occurring. See, Wenyan et al., "Smart Coating for Corrosion Indication and Prevention: Recent Progress" found online at
https://ntrs.nasa.gov/citations/20120003396 (22 Mar. 2009) and Pearman et al., "Release Properties and Electrochemical Characterization of Encapsulated Corrosion inhibitors for Environmentally Friendly Smart Coatings",
https://ntrs.nasa.gov/citations/20160000601 (15 Nov. 2015).

Recently, U.S. Pat. No. 10,767,058 by one of the inventors named herein has disclosed controlled release particles made by an ionic water-soluble corrosion inhibitor that is complexed with an oppositely charged surfactant, polymer, polymer precursor or liquid that is subsequently encased within a solid or gel matrix. The system is said to release corrosion inhibitors upon exposure to basic or acidic pH as well as heat.

The primary drawback of release mechanisms based on microencapsulation is that the degradation of the microcapsule wall initially starts at a very localized point and may not significantly expand or quickly release the contained contents. Such delays in the release mechanism allow time for additional corrosion that can accumulate at a faster rate than desired with the attendant weakening of the metal substrate. Thus, it would be desirable to have a smart particle system that did not rely on encapsulation or the dissolution of an external capsule wall before release of the functional moieties.

Beyond corrosion, the growth of microorganisms like bacteria or algae on or in metallic structures breaks down any protective coating and increases the spread of corrosion. Current antifouling treatments are based on the use of hazardous organic biocides, biocidal metals (such as tin, zinc and copper), pesticides, or other antimicrobial chemicals to actively kill undesired microorganisms. Their poisonous action and propensity to generate resistant organisms makes many biocides unsuitable for human and environmental health.

It would be desirable to have a smart particle system that was able to release functionally reactive compounds that would provide antimicrobial protection along with corrosion resistance upon exposure to an environmental stimulus that prompts the release of such compounds from the smart particle.

Conventional hydrophobic and superhydrophobic coatings (collectively "hydrophobic) often involve the modification of only the top surface, usually just a monolayer thickness, to obtain superhydrophobicity. Once the monolayer has been removed, due to abrasion or other mechanical events during use, the surface loses its hydrophobic properties.

It would be desirable to have a hydrophobic coating that was durable and resistant to abrasion and partial loss of coating integrity.

There are many benefits when a single added ingredient imparts multiple functions to a product. First, lower amounts of the ingredient are needed while the same or better performance is delivered. Second, fewer types of active agents are added into the system to alleviate potential interaction between the various ingredients. Finally, the use of a single additive of multifunctionality can allow greater loading of the active compounds in those circumstances requiring greater protection much like paints having a higher pigment concentration can provide better coverage so too can higher levels of protectant smart particles provide greater protection.

It would also be desirable to have a smart particle system that could change from a stable complex to a dissociated complex so as to release functionally reactive compounds that were previously bound up in the stable complex.

It would further be desirable if the first functionally reactive compound released from the stable complex provided a functional reaction that supported and complemented the effects of the second functionally reactive compound. For example, the first functional reactive compound reacted with the metal substrate to form an insoluble metal chelate while the second functional reactive compound has antimicrobial properties and prevents the growth of bioorganisms that propagate corrosion of the metal.

SUMMARY OF THE INVENTION

It is an object of the invention to provide a smart particle additive for a coating system that would provide multiple levels and types of protection to a substrate, such as metal, wood, or plastic, that was coated with the coating accorded by the present invention.

It is further an object of the invention to provide an enhanced paint or coating having smart particles that would release functionally reactive compounds for corrosion protection and/or antimicrobial protection upon exposure to an environmental stimulus that prompts the release of such compounds from the smart particles dispersed within the coating.

It is also an object of the invention to provide a hydrophobic coating that is durable and resistant to abrasion and loss of integrity.

In accordance with these and other objects of the invention that will become apparent from the description herein, a film-forming composition according to the invention comprises multifunctional smart particles dispersed therein, said multifunctional smart particles each comprising: a plurality of dissociable complex solids having anticorrosion and/or antimicrobial agents that are entrapped within a structural matrix whose outer surface has been modified by reaction with a surface modifying agent to provide hydrophobic and/or antimicrobial properties to said smart particles;

wherein said dissociable complex solids comprise (i) a first functional agent having a first electronic charge, and (ii) a second functional agent having a second electronic charge that is opposite to said first electronic charge and which form bonds that are disrupted by a localized change in pH indicative of corrosion and thereby release the first and second functional agents from said dissociable complex.

The present invention also relates to the multifunctional smart particles, their methods of manufacture, and methods of use.

By creating coating materials for coating incorporation, the present invention circumvents many of the shortcomings associated with protective coatings. For example, the coatings of the present invention are durable because abrasion of the coating merely exposes further layers of particles that enable the coating to retain its hydrophobic, antimicrobial and/or corrosion resistance properties.

The multifunctional smart particles of the present invention provide at least two types of protection to coatings in which the particles are dispersed. The outer surface of the particles is reacted with hydrophobic and/or antimicrobial surface modification agents that impart hydrophobic and/or antimicrobial properties to the applied coating. Should the coating be damaged or compromised, the core releases its payload of functional agents, e.g. corrosion inhibitors and/or antimicrobial agents, that were bound together in a dissociable complex, upon a local pH change indicative of corrosion or growth of a microbial colony. The released agent or agents mitigate and control further growth of the corrosion or colony even at very low loading rates, e.g., from 1-5 wt %. Coatings that contain such materials provide better protection for longer periods than coatings that lack such multifunctional smart particle additives.

DETAILED DESCRIPTION OF THE INVENTION

The present invention provides a multifunctional smart particle that provides multiple types and levels of protection when added to a film-forming liquid or powder coating composition and applied over a substrate. Suitable substrates include metallic structures that are prone to corrosion and sanitary work surfaces of metal, wood, or synthetic plastics that must be provided with a durable, microbe-resistant surface.

The smart particles of the invention use smart particles that have a dissociable, weakly bound complex having anticorrosion and/or antimicrobial agents within a porous matrix at least a portion of whose outer surface has been reacted with a surface modifying agent that provides hydrophobic and/or antimicrobial properties to the smart particle.

The preferred smart particles of the present invention provide particulate smart particles having: (a) permanent water repellency and/or antimicrobial properties when used in an applied coating, (b) and corrosion resistance with anticorrosion agents and antimicrobial agents that are released at the onset of a pH change that triggers the degradation of the bonds holding the complex together.

There are two parts to the multifunctional smart particles of the invention. The core particle has dissociable complexes embedded within pores of a porous matrix that can release an active agent when the complex dissociates, and a modified outer surface of the matrix that is innately active with hydrophobic and/or antimicrobial effects.

The compounds in the preferred dissociable complex include at least one first functional agent that is a corrosion inhibitor compound or antimicrobial compound having a first charge. The other functional agent in the complex has an opposite charge and can be merely an agent for forming the complex or may be another antimicrobial compound that provides antimicrobial protection when released.

Such options allow a number of possible combinations in Table 1:

TABLE 1

| Combinations of functions | |
| --- | --- |
| Dissociable complex solid | Outer Surface |
| Corrosion mitigation | Water resistance |
| Corrosion mitigation | Antimicrobial activity |
| Antimicrobial release | Water resistance |
| Antimicrobial release | Antimicrobial activity |
| Corrosion mitigation and Antimicrobial release | Water resistance |
| Corrosion mitigation and Antimicrobial release | Antimicrobial activity |

The agent complexes within the matrix are held together by weak intermolecular or intramolecular interactions such as hydrogen bonds, electrostatic interaction, electronic coupling, donor-acceptor interaction, and Van der Waals interactions, ion pairing, contact pairing and many other kinds of intermolecular forces, that are reversible. Among these, electrostatic interactions play an important role in the formation of noncovalent complexes. In many cases, a positive or negatively charged complexing agent is selected to react to an oppositely-charged active agent to form a weakly-bonded complex that can be disassociated by a trigger, such as a localized pH change, to release the active agent. The weakly-bonded complexes self-assemble into micelles, vesicles, and emulsions that depend on not only the specific active agent's chemical structure and reactivity and physical properties but also the strength of the interaction between active agent and complexing agent.

The type of weak electrostatic bonds formed by the dissociable complex of the present invention are weaker than ionic bonds and more like the electrostatic bonding exhibited by proteins. See U.S. Pat. No. 10,118,971. Such bonds are categorized as "non-covalent electrostatic attractions" and encompass micelles, vesicles, and emulsions formed by, e.g., a positively charged corrosion inhibitor and an anionic surfactant. See, FIG. 1 in U.S. Pat. No. 10,767,058.

The Dissociable Complex

The dissociable complexes found within the core particulate solid are based on a dissociable bond of the type found in micelles, vesicles, and emulsions. Indeed, the preferred complexes are believed to self-aggregate to form such structures in solution. The individual bonds can be hydrogen bonds, covalent bonds, ionic bonds, electronic interactions, donor-acceptor interactions, and Van der Waals interactions, ion pairing, contact pairing, and many other kinds of labels applied to intermolecular forces that are reversible. Preferably, the bonds are based on non-covalent electrostatic attraction between the complexing agent and the active agent that holds the complex together. The complex forms a solid having a particle size within the range of about 0.5-500 nm in diameter.

The present invention preferably uses dissociable bonds in forming the complexes that are vulnerable to a specific type of environmental stimulus, such as pH changes, that change the local electronic environment sufficient to overcome the electrostatic forces holding the complex together. The complex then dissociates and releases the previously complexed functional agent for one or more local reactions. This is the "trigger" that releases of the bound, functional agents from the present smart particles.

When the smart particles of the present invention are exposed to an appropriate local, environmental stimulus, like a pH change, the chemical interaction or bond holding the first and second functional agents within the dissociable complex solid are overcome and release these components into the local environment. For example, corrosion inhibitors will migrate to the metal surface and form protective layers that prevent further corrosion.

A pH change near the smart particles triggers the degradation of the complex within and the release of the previously bound compounds. For example, the initiation of metal corrosion can raise the local pH at a metal surface. The trigger to release an anticorrosive inhibitor is preferably chosen to degrade at a high pH, such as a within the range of 9-11. Similarly, the growth of microbes often decreases the local pH around the smart particle. A trigger for release of an antimicrobial agent is preferably chosen for degradation at a low or neutral pH, such as a pH within the range of 3-6.

Accordingly, a bound complex containing a corrosion inhibitor desirably degrades at a pH within the range of 9-11 and releases the corrosion inhibitor compound that had been previously bound therein.

Similarly, a bound complex containing an antimicrobial agent desirably degrades at a pH within the range of 3-6 and releases the antimicrobial agent compound that had been previously bound therein.

Preferably, the first component in the complex is a first functional agent, and the second component is a second functional agent although one of them may be a complexing agent that is provided for the function of forming a complex with the other component. Even more preferably, the first functional component is a complexing agent that is attracted to the second functional component which is an anticorrosion agent or antimicrobial agent.

Suitable complex-forming agents include: an anionic surfactant, anionic polymer, nonionic surfactant, amphoteric surfactant, cationic surfactant, cationic polymer, quaternary ammonium surfactant, or a biosurfactant.

Preferred complexing agents include: (a) anionic surfactants, polymers and compounds, such as carboxylates, phosphates, sulfates, or sulfonates (e.g., sodium dodecyl sulfate sodium dodecylbenzenesulfonate, polystyrene sulfonate, polyacrylic acid, dimethylpyrazole, 2-mercaptobenzothiazole and its salts, stearic acid, lauric acid, citric acid, salicylic acid, ascorbic acid, polyvinyl chloride, decyl glucoside, methacrylic acid and polymers thereof, 2-acrylamido-2-methyl-1-propane sulfonic acid and polymers thereof, polyglutamic acid, sulfoethyl-cellulose, carboxymethyl-cellulose and 3-methyl-5-pyrazolone); (b) nonionic surfactants such as poly(alkylene oxide) block copolymers, oligomeric alkyl poly(ethylene oxide), alkylphenal poly(ethylene oxide); (c) cationic surfactants and polymers, benzotriazole, isothiazolinones, such as methylisothiazolinone, chloromethylisothiazolinone, benzisothiazolinone, octylisothiazolinone, dichlorooctylisothiazolinone and butylbenzisothiazolinone, 2-carboxyphenyl phosphate, 4-nitrophenyl phosphate disodium salt, diethyl chlorophosphite, phosphoenolpyruvic acid, tetra-n-butylammonium phosphate, polyaniline, tritolyl phosphate, polylysine, diethylamine-cellulose, and triethylamino-cellulose; (d) quaternary cationic surfactants and polymers (e.g., behentrimonium chloride, benzyldimethylhexadecylammonium chloride, hexadecyltrimethylammonium bromide, hexadecyltrimethylammonium chloride, benzalkonium chloride, miristalkonium chloride, benzethonium chloride, benzododecinium bromide, carbethopendecinium bromide, cetalkonium chloride, cetylpyridinium chloride, didecyldimethylammonium chloride, didecyldimethylammonium carbonate, polydiallyldimethylammonium chloride, dimethyldioctadecylammonium chloride, dimethyldioctadecylammonium bromide, domiphen bromide, stearalkonium chloride, 3-(methacryloylamino) propyl trimethylammonium chloride and polymers thereof, acrylamido-N-propyltrimethylammonium chloride and polymers thereof), gemini surfactants, bolaform surfactants, tri-headgroup cationic surfactant, and tetra-headgroup rigid bolaform surfactants; (e) amphoteric surfactants and compounds, such as betaines (e.g., cocamidopropyl betaine, lauryl betaine, oleyl betaine, betaine citrate, and (carboxylatomethyl)dimethyl(octadecyl)ammonium), sultaines (e.g. lauryl hydroxysultaine, cocamidopropyl hydroxysultaine, lauramidopropyl hydroxysultaine, oleamidopropyl hydroxysultaine, tallowamidopropyl hydroxysultaine and erucamidopropyl hydroxysultaine), propionates (e.g. coco amino propionate, sodium lauryl imino dipropionate, sodium octyl imino dipropionate), and sodium coco amphoacetate, disodium cocoamphodiacetate, behenoyl pg-trimonium chloride, sodium hydroxymethylglycinate, dodecyldimethylamine, myristamine oxide, benzotriazole-methanol and benzotriazolecarboxylic acid; (e) aminosilanes or quaternary aminosilanes (e.g., 3-aminopropyltrimethoxysilane (APS) and N-trimethoxylsilylpropyl-N, N, N-trimehylammonium); and (f) biosurfactants (e.g., glycolipids, sophorolipids, rhamnolipids, glycine, cholic acids such as lithocholic acid, glycocholic acid and their salts, and chloride (TMAPS) as co-structure-directing agents). The preferred complex-forming agents form micelle, vesicle, or emulsion structures in aqueous systems.

The preferred ionic surfactants are cationic because most of the suitable corrosion inhibitors are anionic. More generally, the surfactant can be alkyl (C8-C22) trimethylammonium X (where X refers to a selected halogen anion, such as chloride, bromide, fluoride, and iodide), for instance, cetyltrimethylammonium X, dodecyltrimethylammonium X, tetradecyltrimethylammonium X, hexadecyltrimethylammonium X, octadecyltrimethylammonium X, or dodecyltrimethylammonium X. Or it can be alkylammonium methosulfate, alkyldimethylammonium methosulfate, cetyltrimethylammonium hydrogen sulfate, hexadecyltrimethylammonium p-toluenesulfonate, or cetylpyridinium chloride. It may also be bis(cetyldimethylammonium)butane dibromide ($C_{16}C_4Cl_6Br_2$), or a similar bis-structured surfactant. Preferred cationic surfactants are hexadecyltrimethylammonium bromide, hexadecyltrimethylammonium chloride, didecyldimethylammonium carbonate, polydiallyldimethylammonium chloride, benzisothiazolinone, and miristalkonium chloride.

Preferred anionic complexing agents are sodium dodecyl sulfate, polyacrylic acid, and sodium 2-mercaptobenzothiazole.

Preferred cationic and anionic surfactants have C12-C22 alkyl chains.

Ionic liquids can also be used to complex the ionic corrosion inhibitor. Preferred ionic liquids are alkyl-substituted imidazolium and pyridinium cations, with halide counterions. An example is 1-allyl-3-methylimidazolium chloride (AMC). Other examples include 1-alkylpyridinium and N-methyl-N-alkylpyrrolidinium.

Especially preferred complexing agents are hexadecyltrimethylammonium bromide, polyacrylic acid, sodium dodecyl sulfate, didecyldimethylammonium carbonate, polydiallyldimethylammonium chloride, or sodium 2-mercaptobenzothiazole.

In other embodiments, there is no need to use a structural matrix agent. The complex made from the first component (e.g., surfactant, polymer, or polymer precursor) complexed with the second component (e.g., a corrosion inhibitor) may precipitate into particles of sufficient size (e.g., 50-500 nm) that can be reacted with a surface modification agent and used as the particulate additives of the present invention.

Corrosion Inhibitors

In general, a corrosion inhibitor is a substance applied to an environment that significantly reduces the corrosion rate of materials (especially metals) exposed to that environment. In general, corrosion inhibitors fall into one of four types:

(a) Anodic inhibitors—These types of corrosion inhibitors act by forming a protective oxide film on the surface of the metal. It causes a large anodic shift that forces the metallic surface into the passivation region, which reduces the corrosion potential of the material. Some examples are chromates, nitrites, molybdates, and tungstate.

(b) Cathodic inhibitors—These types of inhibitors slow down the cathodic reaction by limiting the diffusion of reducing species to the metal surface. Cathodic poisons and oxygen scavengers are examples of this type of inhibitor.

(c) Mixed inhibitors—These are film-forming compounds that reduce both the cathodic and anodic reactions. The most commonly used mixed inhibitors are silicates and phosphates used in domestic water softeners to prevent the formation of rust water.

(d) Volatile corrosion inhibitors (VCI)—VCI are compounds being transported in a closed environment to the site of corrosion by the process of volatilization from a source. For example, in boilers, volatile compounds such as morpholine or hydrazine, are transported with steam to prevent corrosion in condenser tubes.

The anticorrosion agents useful for the present invention include anodic inhibitors, cathodic inhibitors, and mixed inhibitors. Preferred anticorrosion agents have a charge opposite that of the chosen complexing agent and that can form the desired non-covalent electrostatic attraction with the complexing agent in an aqueous system.

If the active agent is an ionically neutral molecule, the active agent will have to be activated by exposure to an acidic or alkaline solution before a triggering agent can be used to allow the active agents to be released.

If ultraviolet light is the trigger, the binding agent is an ultraviolet-reactive molecule containing a photoreactive group, such as arylazide.

In one embodiment, the solubility and mobility of the corrosion inhibitor compounds are reduced by complexing the inhibitor agent (such as sodium molybdate) with an oppositely-charged compound (such as a cationic surfactant cetyltrimethylammonium halide) in an aqueous solution. The surfactant-immobilized inhibitors may then self-assemble into a micelle, vesicle, or other type of dissociable complex.

Some corrosion inhibitors are cationic, including some metal salts. For these, anionic surfactants or other anionic complex partners are useful. Anionic surfactants that can be used in some embodiments of the invention include alkyl (C8-C22) sulfate Y, where Y is a cation such as sodium. Examples are sodium dodecylsulfate and sodium hexadecylsulfate. C8-C22 fatty acids can also be used as anionic surfactants.

Suitable corrosion mitigation compounds for the present smart particles are compounds that react with surface metal to form an insoluble oxide layer or chelate with surface metal to form an insoluble film of a protected substrate to thereby mitigate corrosion and interfere with its spread across the protected metal substrate.

Preferred corrosion mitigation compounds include those in the following table 2.

TABLE 2

Corrosion inhibitors

| Function | Compounds |
|---|---|
| Corrosion resistance and mitigation | Nitrite compounds, e.g. calcium. nitrite, sodium nitrite, potassium nitrite, and lithium nitrite; Molybdate compounds, e.g. alkali metal salts (preferably lithium molybdate, sodium molybdate, potassium molybdate), alkaline earth metal salts (preferably calcium molybdate), and zinc molybdate; Chromate compounds combined with individual and combinations of metals, such as zinc, calcium, strontium, barium, aluminum, magnesium, potassium, iron, e.g. zinc potassium chromate, and organically modified versions thereof; Phosphate compounds, such as phosphates, orthophosphates, polyphosphates, hydrogenorthophosphates, phosphosilicates combined with individual and combinations of metals, such as zinc, calcium, strontium., barium, aluminum, magnesium, potassium, iron, e.g. zinc calcium strontium aluminum orthophosphate silicate hydrate, and organically modified versions thereof; Phosphoric acids and their salts, ortho-phosphoric, pyrophosphoric, mono- and di-alkyl or aryl-esters of ortho-phosphoric and pyro-phosphoric acid, tripoly-phosphoric, polyphosphoric acid; metaphosphoric, trimeta-phosphoric, poly-metaphosphoric acid; phosphorous (phosphonic) acid and derivatives of phosphonic acid; alkyl and aryl esters of thio-phosphoric and dithio-phosphoric acid; Acids, e.g. molybdic, phospho-molybdic, silico-molybdic acid; boric acid; cyanamidic acid; nitrous acid, trithiocyanuric acid (TMT), and dithiocyanuric acid; Thio- and dithiocarbonic acid derivatives, such as o-alkyl esters; N-alkyl dithiocarbamates; pyrrolidinecarbodithioic acid; Borate compounds, e.g. calcium borate, barium borate, and barium metaborate; Organic compounds, e.g., Thiazoles, such as mercaptobenzothiazole ion with hydrogen, sodium, zinc, strontium, calcium, and other counter-ions; |

TABLE 2-continued

Corrosion inhibitors

| Function | Compounds |
|---|---|
| | Azoles, such as 1,3,4-thiadiazole-2,5-dithiol, 2,4-dimercapto-s-triazolo-[4,3-b]-1,3-4-thiadiazole or 5,5'-dithio-bis(1,3,4 thiadiazole-2(3H)-thione with hydrogen sodium, zinc, strontium, calcium, and other counter-ions, benzotriazole with hydrogen sodium, zinc, strontium, calcium and other counter-ions; benzotriazole derivatives, including 1H-Benzotriazole-1-methanol, benzotriazole carboxylic acid, hydrogen, sodium, zinc, strontium, calcium, and other counter-ions; 8-hydroxyquinoline with hydrogen sodium, zinc, strontium, calcium, and other counter-ions; (2-benzothiazolylthio) butanedioic acid; Poly(3-ammoniumpropylethoxysiloxane)dodecanoate, The 4-oxo-4-p-tolylbutyric acid adduct with 4-ethylmorpholine; Mercapto derivatives, such as mercapto-benzothiazole, mercapto-benzoxazole, mercapto-benzimidazole, or combinations of the above; di- or poly-mercapto organic compounds, such as di-mercapto derivatives of thiophene, pyrrole, furane, and of diazoles and thiadiazoles; di- and tri-mercapto derivatives of pyridine, diazines, triazines and of benzimidazole and benzothiazole, such as: dimercaptopyridine, 2,4-dithiohydantoine, and 2,4-dimercapto-6-amino-5-triazine; carboxylic and di-carboxylic acids, such as ascorbic, salicylic acid, phthalic acid, nitro-phthalic acid and succinic acid; and derivatives of succinic acid such as: 1-(benzothiazol-2-ylthio)succinic acid. Compounds containing cationic species of Li, Mg, Al, Zn, Ca, Sr, La, Ce, Fe, and Bi as their oxides, hydroxides, and salts. Combinations of any of the above compounds with each other, e.g. organically modified zinc aluminum molybdenum orthophosphate hydrate |

Some especially preferred examples of corrosion inhibitors include: sodium molybdate, lithium molybdate, sodium nitrite, potassium nitrite, calcium nitrite, benzotriazole, benzotriazolemethanol, benzotriazolecarboxylic acid, sodium chromate, potassium chromate, 1,3,4-thiadiazole-2,5-dithiol, 8-hydroxyquinoline, sodium 2-mercaptobenzothiazole, potassium 2-mercaptobenzothiazole, ammonium 2-mercaptobenzothiazole, or mixtures thereof.

The Porous Matrix

A matrix-forming agent is added to the solution containing the formed complexes and allowed to undergo a sol-gel reaction to form a gel matrix around the dissociable complexes. These particulate cores release the anticorrosion or antimicrobial compounds when the triggering pH change occurs. See, Zhang et al. U.S. Pat. No. 10,767,058.

The environmental stimulus that acts as the trigger to release the functional compounds in the core complex should be chosen based on the types of specific moieties that are chosen for the smart particle. For example, if the active agent is ionic, a preferred triggering agent is a counter ionic compound, such as an ionic surfactant, ionic polymer or oppositely charged molecule.

The porous matrix that forms the structural agent in the present invention can be organic, inorganic or an inorganic-organic hybrid but is preferably inorganic. The inorganic framework can he any kind of metal oxide, metal hydroxide, or metal substance. In some embodiments, the matrix is or includes Si and/or metal materials such as Al, Fe, Mg, Mn, Cu, Zn, Ca, Ti, Sn, Mo, W, Co, Pd, Pt, Zr, Ni, or combinations thereof. In other embodiments, the matrix is or includes materials such as $SiO_2$, $TiO_2$, $Al_2O_3$, $CaO$, $ZnO_2$, $MgO$, $ZrO_2$, $V_2O_3$, $V_2O_5$, $Cu_2O$, $CuO$, $Mn_2O_3$, $Mo_2O_3$, $WO_3$, $Fe_3O_4$, or combinations thereof. In some embodiments the matrix is a hybrid of Si and/or metal and/or metal oxides combined with organic materials resulting in an inorganic-organic hybrid. Preferably, the matrix is some form of silica.

Oxides of silicon, aluminum, zirconium, calcium, titanium, vanadium, and some other transition metal oxides can be dissolved in either a strong basic or acidic solution, depending on the oxide. For example, solid silica particles can be partially dissolved where the pH is basic from about 10 to 13.5, more preferably from about 12 to about 13.5. Also, solid alumina can be dissolved under both acidic and basic conditions—where the pH is lower than 3 or higher than 10.5. Thus, the inorganic matrix itself may be partially or totally dissolved under the acidic or basic conditions of the corrosive process along with the bound complexes lodged within the pores of the matrix.

In the case of a silica carrier, the precursors include tetraethyl orthosilicate (TEOS), sodium silicate, tetramethyl orthosilicate (TMOS), and other silica ($SiO_2$)sources. The matrix-forming agent is preferably tetraethylorthosilicate. With only a modest increase of pH to about 9 by the addition of ammonium hydroxide, TEOS undergoes hydrolysis and condensation to form branched and linear silica polymers that form a silica matrix or cage encasing the surfactant-corrosion inhibitor complex as the core particle of the present invention. This core particle is then reacted with a surface modification agent that will impart additional levels or types of protection to the film formed by the coating composition to which the present additive solids have been added.

The materials that form the porous matrix are preferably added to an aqueous system in which the dissociable complex was formed. The matrix can then surround and react to form an entrapping matrix with the dissociable compounds trapped within the pores of the matrix. This is the core particle.

The Functionalized Outer Core Surface

The core particle is reacted with one or more surface modification agents that will cause the outer surface of the treated core particle to exhibit a modified surface effect, preferably hydrophobic or antimicrobial properties that will enhance any coating in which the modified core particles are dispersed.

For example, a hydrophobic outer surface on the core particles of the invention will add water resistance to the paint that prevents the incursion of moisture beyond the coating. As a moiety that has reacted with the outer surface of the porous matrix, the hydrophobic properties remain associated with the particle and continue to provide hydrophobic effects to the coating in which the particles are dispersed.

If the coating is damaged such that moisture penetrates the coating to the metal substrate, the pH change from the onset of metal corrosion itself will disrupt the weak bonds holding the dissociable complex together within the matrix so that the complex dissociates and thereby release the functional agents making up the complex. This complex dissociation process is the second line of protection. If the bound complex contains an anticorrosion agent, the agent migrates to the metal surface and forms a protective layer that stops further corrosion.

Hydrophobic Agents

Suitable water resistance compounds for use in the present smart particles are compounds that react with the matrix material to form a hydrophobic outer surface over the smart particles. Preferred water resistance compounds include those listed in table 3.

TABLE 3

| Hydrophobic Agents | |
| --- | --- |
| Function | Agents |
| Hydrophobic surface characteristics | Hydrophobic and superhydrophobic surface modification using fluorinated compounds, such as heneicosafluorododecyltrichlorosilane, heptadecafluorodecyltrichlorosilane, tridecafluorooctyltrichlorosilane, tridecafluorooctyltrimethoxysilane, tridecafluorooctyltriethoxysilane, poly(tetrafluoroethylene), nonafluorohexyltrimethoxysilane and other fluorinated silanes. Hydrophobic and superhydrophobic surface modification using non-fluorinated compounds, such as octadecyltrimethoxysilane, octadecyltriethoxysilane, octadecyltrichlorosilane, hexadecyltrimethoxysilane, hexadecyltriethoxysilane, hexadecyltrichlorosilane, methyltrimethoxysilane, vinyltriethoxysilane, paraffin wax, ethyltrimethoxysilane, propyltrimethoxysilane, bis(methyldiethoxysilylpropyl)amine, bis(methyldimethoxysilylpropyl)-n-methylamine, bis(3-trimethoxysilylpropyl)amine and other non-fluorinated silanes. |

The hydrophobic modification agent should be reacted at reactive sites over at least a portion of the outer surface of the smart particle matrix. Preferably, substantially all or all exposed and reactive sites on the outside of the smart particles are reacted with the surface modification agent.

The amount of surface modification can also be determined as a weight percent based on the whole smart particle weight. Suitable amounts are within the range of 0.1 to 30 wt % and preferably within the range of 0.1-20 wt % and most preferably within the range of 0.1-10 wt %. For example, according to certain preferred embodiments, the modification component tridecafluorooctyltriethoxysilane is used in an amount within the range of 0.1-10 wt %. (It should be understood that the range of 0.1-30 wt % contemplates the use of concentrations at 0.1 wt % increments along the entire range from the lower number to the higher number in the stated range.)

Especially preferred surface modification agents which can be used in an embodiment of the invention are tridecafluorooctyltriethoxysilane or hexadecyltrimethoxysilane. These molecules undergo condensation with the silanol groups Si—O or M—O of the smart particle surface thereby releasing ethanol to bond the tridecafluorooctylsilyl or hexadecylsilyl groups via Si—O or M—O covalent bonds to the outer surface of the matrix of the present smart particles. The tridecafluorooctylsilyl or hexadecyl moiety of the tridecafluorooctylsilyl or hexadecylsilyl groups attached to the smart particle surface provide a framework that have a hydrophobicity similar to polytetrafluoroethylene.

Some embodiments provide hydrophobic functions for these applications to enhance the performance, since many microorganisms require water to live and reproduce. Dual-function smart particles of the present invention synergistically improve the antimicrobial performance as well as water resistance of the matrix, providing significant advantages over competing technologies.

When the smart particles of the present invention contain corrosion inhibitors and the smart particles are hydrophobic, the matrix can be imparted with hydrophobicity to keep the water from reaching the metal substrate. However, should corrosion occur, the release of corrosion inhibitors can actively mitigate the corrosion.

Antimicrobial Agents

Antibacterial, antibiofouling, antifungal or antiviral smart particles (collectively referred to as "antimicrobial" in this application) can be placed on the outer surface or bound up in the complexes trapped within the matrix of the present invention. Antimicrobial moieties bound to the outer surface of the matrix remain attached to the matrix and impart antimicrobial properties to the coating in which the present smart particles are dispersed. Antimicrobial agents bound in the entrapped complexes within the matrix pores release the antimicrobial compounds in response to degradation of the complex due to the pH changes from the growth of microbes on the protected surfaces and kill the microbes that caused the pH change.

Suitable materials for the bound core complex and for surface reaction are listed in Table 4.

TABLE 4

| Antimicrobial Agents | |
| --- | --- |
| Function | Agent |
| Anti-microbial complex agents | Quaternary ammonium compounds, such as: behentrimonium chloride, benzyldimethylhexadecylammonium chloride, hexadecyltrimethylammonium bromide, hexadecyltrimethylammonium chloride, benzalkonium chloride, miristalkonium chloride, benzethonium chloride, benzododecinium bromide, carbethopendecinium bromide, cetalkonium chloride, cetylpyridinium chloride, didecyldimethylammonium chloride, didecyldimethylammonium carbonate, polydiallyldimethylammonium chloride, dimethyldioctadecylammonium chloride, dimethyldioctadecylammonium bromide, domiphen bromide, stearalkonium chloride, 3-(methacryloylamino) propyl trimethylammonium chloride and polymers thereof, acrylamido-N-propyltrimethylammonium chloride and polymers thereof, (styrylmethyl) bis(triethoxysilylpropyl) ammonium chloride; Isothiazolinone compounds, such as methylisothiazolinone; chloromethylisothiazolinone; benzisothiazolinone; octylisothiazolinone; dichlorooctylisothiazolinone; and butylbenzisothiazolinone; Pyrithione compounds, e.g., zinc pyrithione, lithium pyrithione, sodium pyrithione; Piroctone compounds, e.g., piroctone olamine; Azole compounds, e.g. imidazoles such as bifonazole, butoconazole, clotrimazole, econazole, enticonazole, isoconazole, ketoconazole, luliconazole, miconazole, omoconazole, oxiconazole, sertaconazole, sulconazole, and tioconazole; triazoles such as albaconazole, efinaconazole, epoxiconazole, fluconazole, isavuconazole, itraconazole, posaconazole, propiconazole, ravuconazole, terconazole, and voriconazole; and thiazoles such as abafungin; |

TABLE 4-continued

Antimicrobial Agents

| Function | Agent |
|---|---|
| Anti-microbial surface modification agents | Selenium disulfide; N-(2,4,6-trichlorophenyl) maleimide (TCPM); Copper compounds, e.g., cupric oxalate, copper (I) bromide; Silver compounds, e.g., silver ions, and organic silver 3-(n-styrylmethyl-2-aminoethylamino) propyltrimethoxysilane hydrochloride; 4-(trimethoxysilylethyl) benzyltrimethylammonium chloride; N-(2-n-benzylaminoethyl)-3-aminopropyltrimethoxysilane hydrochloride; n,n-didecyl-n-methyl-n-(3-trimethoxysilylpropyl)ammonium chloride; N-trimethoxysilylpropyl-n,n,n-trimethylammonium chloride; octadecyldimethyl (3-trimethoxysilylpropyl)ammonium chloride; S-(trimethoxysilylpropyl)isothiouronium chloride; and tetradecyldimethyl(3-trimethoxysilylpropyl)ammonium chloride; 3-(Trihydroxysilyl)propyldimethyloctadecyl ammonium chloride |

The antimicrobial agents can also include at least quaternary ammonium cations which comprise an antimicrobial positively charged quaternary ammonium cation, including didecyldimethyl ammonium, alkyldimethylbenzyl ammonium and alike, and an anion including carbonate/bicarbonate, chloride, nitrate, and alike.

Preferred antimicrobial agents are didecyldimethylammonium carbonate, miristalkonium chloride, N-(2,4,6-trichlorophenyl) maleimide (TCPM) and benzisothiazolinone.

Preferred antimicrobial surface modification agents are (Trihydroxysilyl)propyldimethyloctadecyl ammonium chloride and octadecyidimethyl (3-trimethoxysilylpropyl)ammonium chloride As noted above, in some circumstances, the use of an agent that forms a hydrophobic coating can also be considered as having an antimicrobial effect. The high hydrophobicity prevents the initial adherence of microorganisms on the surface. A hydrophobic coating also deprives microorganisms of the water they need to live, e.g., by causing the water to bead and easily wicks off the surface. Such actions naturally remove biofilms, food sources and pathogens without external input but should microorganisms grow on the surface, the inherently antimicrobial surface actively kills the bio-organisms.

The antimicrobial agents released from the smart particle can exhibit microbicidal properties that kill any accumulated bio-organisms.

Combined, the antimicrobial smart particles impart their antimicrobial properties to the fluid or coating which now innately kills microorganisms, delivering continuous protection. The multifunctional antimicrobial protection—hydrophobic self-cleaning, innately antimicrobial surface and release of the antimicrobial active agent—are complementary and durable, leading to high, long-lasting performance.

Manufacture

Preferably, the multifunctional smart particles of the present invention are made with a process that comprises:

(a) combining a corrosion inhibitor or antimicrobial compound with a complexing agent in aqueous solution to form a dissociable complex having size within the range of 50-500 nm suspended within the solution;

(b) adding to the solution with the dissociable complexes a matrix-forming structural agent and thereafter allowing the matrix to form porous matrix solids around the dissociable complexes to form smart core particles of dissociable complexes dispersed throughout pores in said matrix; and (c) contacting the smart core particles with a functional surface modification agent selected from the group hydrophobic agents or antimicrobial agents and allowing the surface modification agent to react with at least a portion of the smart core particle exterior surfaces and thereby impart hydrophobic and/or antimicrobial effects to the resulting smart particle.

In some embodiments of the invention, as described in our U.S. Pat. No. 10,767,058, forming the controlled-release material comprises a formation of a dissociable complex and a matrix. For example, the dissociable complex comprises the reaction product of sodium molybdate or sodium or potassium salts of 2-mercaptobenzothiazole and a counter-ionic surfactant such as alkyltrimethylammonium halide (CnTAX, where X refers to a selected halogen anion, such as chloride, bromide, fluoride, and iodide and n refers to the number of carbon atoms). This complex could be solid like an aggregation (such as flocculate, precipitate, or colloid) or water soluble. In the case of molybdate and C16TAX, the complex formed is water soluble; while in the case of sodium 2-mercaptobenzothiazole and C16TAX, the initial complex is solid, The formation of the dissociable complex is advantageous in that the very water-soluble sodium molybdate can be immobilized by CnTAX and subsequently self-assembled into micro-/meso-structured micelles around which inorganic precursor sol-gel reactions occur to form a matrix (for instance, a silica matrix) around the ionic complex micelles or ionic complex particles. This forms a micro-structured or meso-structured inorganic framework.

When the smart particles are separated and dried to recover a particulate additive, the specific form of the entrapped complexes may change as all or a portion of the water is removed. In other words, a micelle, vesicle, or emulsion may form an entrapped deposit or complex within the matrix pores. The specific forms of such remnants are currently unknown and is generally referred to herein as "dissociable complexes" that reflect their origins as having once been in the form of a micelle, vesicle, or emulsion.

The complex itself dissociates in acid or alkaline conditions, at the same time that the porous silica matrix hydrolyzes in acid or alkaline conditions. So, these two mechanisms work together to provide controlled release of the corrosion inhibitor or antimicrobial compound of the dissociable complex with local presence of an acid or alkaline pH.

Some complexes are thermally sensitive as well, such as NaMBT-CnTA complex (refers to sodium 2-mercaptobenzothiazole-cetyltrimethylammonium), which provides both pH and temperature as dual stimuli-responsive controlled release functions. In this case, above a certain temperature, or above or below a certain pH value, the bound active compound within the dissociable complex is released and mobilized within the coating.

One other embodiment of the invention provides a method of forming a corrosion inhibitor or antimicrobial compound material comprising:

(1) dissolving in polar solvent solution (typically an aqueous solution) (a) a surfactant, polymer, polymer precursor, or ionic liquid; and (b) a corrosion inhibitor or antimicrobial compound; wherein (a) and (b) have opposite charges;

(2) forming a complex of (a) with (b);

(3) forming core particles comprising the complex of (a) with (b); and (4) modifying at least a portion of the outer surface of the core particles with an outer coating comprising a hydrophobic and/or antimicrobial agent;

wherein the particles release the corrosion inhibitor or antimicrobial compound upon exposure of the particles to acidic pH, basic pH, or heat.

Typically, the process of making the porous matrix used in the present multifunctional smart particles includes the step of dissolving in a polar solvent solution a matrix-forming agent. This agent is chosen to have the ability to form a gel or polymer in aqueous solution (so as to entrap and protect the dissociable complex of ingredients (a) and (b)) but that can break down or rearrange when exposed to an acidic (e.g., pH of 5 or less) or a basic pH (e.g., a pH or 9 or more) while being relatively more stable at a more neutral pH.

Once the matrix holding the dissociable complexes have formed, these smart core particles are then contacted with a surface modification agent that reacts with at least a portion of the outer surface of the smart core particles to impart a desired property to the core particles, e.g., hydrophobic and/or microbial effects. These effects are not released from the core particles but permanently impart their hydrophobic and/or antimicrobial properties to the coating in which they have been dispersed.

The preferred manufacturing process for the present smart particles starts with step 1 in which a first functional agent (e.g., a corrosion inhibitor or antimicrobial compound) that is combined with a second functional or non-functional agent to form homogeneous, weakly bound, dissociable complex solids having a size generally within the range of 50-500 nm. The term "weakly bound" is intended to refer to complexes having a bond strength of about 2-10 kJ/mol.

In step 2, the dissociable complexes are combined, often without separating the complexes from the solution (preferably aqueous) in which they were formed, with a structural agent (e.g., tetraethyl orthosilicate, tetramethyl orthosilicate, or sodium silicate). The structural agent polymerizes and forms a porous matrix around the dissociable complexes. This results in core particles having dissociable complexes trapped and dispersed therein.

In step 3, the core smart particles are contacted with a functional surface modification agent under reaction conditions suitable for reaction between the reactive, exposed sites on at least a portion of the outside of the smart core particles and the surface modification agent. Suitable surface modification agents include are selected from the group hydrophobic agents and antimicrobial surface modification agents, as discussed in more detail above.

The surface modification reactions can be carried out right after the formation of the matrix around the complexes in step 2 without separation or recovery of the smart core particles. The surface modification can also be performed on dried, solid particles with suitable mixing, with or without mixing media. Preferably, the smart core particles are separated by centrifuge and dispersed into hexane or other solvent before the surface modification agent is added.

Another embodiment provides a method of forming a corrosion inhibitor or antimicrobial additive for a film-forming liquid (such as a paint) by a process that comprises:

(1) dissolving in an aqueous medium the combination of (a) a complexing agent; and (b) a corrosion inhibitor or antimicrobial agent;

(2) forming dissociable complexes from the attraction between (a) and (b) to a complex size within the range of 50-500 nm;

(3) adding to the aqueous suspension of dissociable complexes a matrix-forming agent that can form a porous solid or gel matrix from the matrix-forming agent around the complex of (a) with (b) so that the complexes are entrapped within the pores thereof to make smart core particles; and (4) reacting the core particles with a hydrophobic and/or antimicrobial surface modification agent that will react with and become bound to at least a portion of the outer surface of the core particles and thereby impart hydrophobic and/or antimicrobial properties to a film-forming coating composition in which the treated particles are dispersed or suspended.

Preferably, the dissociable complex solids will release the corrosion inhibitor or antimicrobial compound when exposed to acidic pH (indicative of microbial growth) or basic pH (indicative of corrosion).

The manufacturing process can be carried out at substantially any temperature that provides for reaction and interaction of the functional agents with the complexing and structural agents. Preferably, the process is carried out at a temperature within the range of 0° to 100° C., more preferably within the range of 10°-75° C., and even more preferably within the range of 15°-55° C.

Uses

The coated core particles can be packaged and sold as a particulate additive to a film-forming composition. The film-forming composition can be waterborne or solvent-based organic coatings or inorganic coatings or a powder-based coating. Examples of solvent-based coatings include solvent-based polymer coatings containing alkyd, epoxy, epoxy ester, polyester, polyester melamine, polyurethane, polyvinyl butyral, and thermoplastic acrylic resins. Examples of waterborne coatings include water soluble polyesters, polyacrylates, polyurethanes, alkyds, epoxies and epoxy esters; water-dispersible vinyl propionate copolymers, vinyl acetate copolymers, acrylate-methacrylate copolymers, and styrene-butadiene copolymers and polymers; styrene-butadiene copolymers, acrylics, alkyds, polyvinyl acetate, and polystyrene latex; and water-based alkyds and polyurethane. Examples of powder-based coatings are thermoset, thermoplastic and UV curable powder coatings.

Examples of inorganic coatings include silicon-based inorganic coatings, and other sol-gel coatings and pretreatments. The coating can also be a latex coating. Typically, the added multifunctional smart particle additive of the present invention is added to the film-forming composition in an amount within the range of about 1 to 20% by weight, preferably about 1 to 15% by weight of the film-forming composition weight.

The present invention of controlled-release particles can be effectively dispersed into various coatings including waterborne or solvent-based coating composition that may for organic coatings, inorganic coatings, or are in powder form to make a powder-based coating. The microstructures and properties of these particles can be designed to optimize controlled release characteristics for corrosion protection of metal structures covered by such coatings.

Smart particles of the invention are applicable to a variety of industries, including but not limited to oil & gas, paints & coatings, aerospace, automobile, construction, infrastructure, personal and home care, plastics, agricultures, cleaning product, 3-D printing and others. Additionally, the smart particles of the invention have application to chemical stabilizing and solubility changing applications. Smart particles of the invention provide a micro-protection capability.

The smart particles are able to block certain reactions happening until they are needed, which helps stabilize active chemicals in various formulations for a number of applications.

The smart particles of the present invention can be dispersed into various matrices, such as coatings, paints, plastics, binders, caulk, putties, sealants, adhesives, polymers, resins to make functional and or multifunctional materials.

The present invention can also be applied to a variety of commercial products and uses. For example, the smart particles can be used as additives for personal care products, such as lotions, shampoos, and makeup. When the active agents encapsulated in the smart particles are nutrient ingredients, including but not limited to vitamins, UV absorbers, enzymes, and pigments, the smart particles can not only protect the active agents from oxidizing but also increase their efficacy by releasing when they are needed.

The smart particles can also be employed in cleaning, hygiene and other home care products, which include but are not limited to household cleaning products, microbial-resistant coatings, and mildew free outdoor surfaces. When the active agents encapsulated in the smart particles are antimicrobial agents, the smart particles can release the active compounds when bacteria or fungi start to grow and keep the matrix free from microorganisms.

Some embodiments provide antimicrobial function in addition to superhydrophobicity and corrosion inhibitor-controlled release for this application. These triple-functioned smart particles impart the matrix materials with water repellent function, enhanced anticorrosion protection and antimicrobial mitigation feature.

The smart particles of the present invention can also be dispersed into adhesives, caulks, plastics, polymers, putties, curable resins, and sealants.

EXAMPLES

Example 1—Preparation of Hydrophobic and Anticorrosive Smart Particles

In a 200 ml beaker, a corrosion inhibitor agent of 5.1 g benzotriazole is dissolved into 105.6 g of 15 wt % ammonium hydroxide solution at 30° C. ($1^{st}$ solution). As with most organic corrosion inhibitors, benzotriazole can form covalent and coordination bonds with surface metal ions, especially with copper. The reaction produces an insoluble chelate film that mitigates further corrosion from occurring and thereby protects the metal surface.

In a separate beaker, a complexing agent of 2.2 g of hexadecyltrimethylammonium bromide is dissolved into 30 g of water at 30° C. ($2^{nd}$ solution). The $2^{nd}$ solution is added into the $1^{st}$ solution. The mixture becomes white and cloudy demonstrating the formation of the first particles and is cooled to room temperature. In step 2, a structural agent of 45 g of tetraethyl orthosilicate, or tetramethyl orthosilicate, or sodium silicate solution is added into the dispersion of $1^{st}$ particles under stirring at 600 rpm to form an emulsion of structural agent and $1^{st}$ particles.

Thereafter, 28.5 g citric acid is diluted in 20 g of water which is added into the emulsion until the pH value is around 8-9. The emulsion is left to react at room temperature for 12 hours under stirring to form smart core particles made of first particles encapsulated in a matrix of structural agent.

Then, 0.5 g of tridecafluorooctyltriethoxysilane or hexadecyltrimethoxysilane is added into the smart core particle mixture and stirred for another 4 hours to obtain the final, coated product.

The solids are separated by centrifuging and washed with deionized water twice and dried at room temperature. The dried products are milled in a grinder to obtain a fine powder suitable for use as an additive having the dual functions of corrosion mitigation and hydrophobic protection.

The particles of this example provide two levels of protection. The first is the outer hydrophobic layer that repels water. These hydrophobic particles are dispersed in a coating and thereby serve as a durable source of hydrophobic protection throughout the coating thickness rather than just at the top surface of the coating.

The second protection comes from the inner anticorrosion agent that is released when the local pH change of corrosion degrades the weak complex of the first particles within the structural matrix of the smart core particles. The complex formed by the reaction between benzotriazole and hexadecyltrimethylammonium bromide forms the component that triggers release of the benzotriazole to inhibit or mitigate the development of metal corrosion. The weak bond between the negatively charged benzotriazole and the positively charged hexadecyltrimethylammonium bromide is weak. That bond can be split by just the local pH change at the onset of corrosion as hydroxyl ions are produced during the corrosion process. Therefore, the initiation of corrosion itself will trigger release of the corrosion inhibitor to stop the corrosion on-demand, on-site.

Example 2—Preparation of Hydrophobic and Antimicrobial Smart Particles

A complexing and antimicrobial agent of 1.5 g benzisothiazolinone is dissolved in 15 g of polyethylene glycol tert-octyiphenyl ether (Triton-100X from Sigma Aldrich) on a stirring plate at room temperature. A second antimicrobial agent of N,N-didecyl-N,N-dimethylammonium carbonate is added into benzisothiazolinone solution. Then, 20 g water is added to the mixture and stirred to form the first particles with antimicrobial properties.

After stirring for 30 minutes, 2.0 g of tetramethylorthosilicate as the structural agent is added to the first particle dispersion under stirring at 600 rpm. The encapsulation reaction is performed at room temperature for 30 minutes with no stirring.

After the reaction is completed, the smart core particle products are separated by centrifuging, sieved through a 25-micron mesh, and washed twice with an ammonia solution. The particles are then dried at room temperature.

A water repellent and antimicrobial agent of 0.5 g 3-(trihydroxysilyl)propyldimethyloctadecyl ammonium chloride is added into the dried sample and mixed in a planetary centrifugal mixer at 1000 rpm for 10 minutes. The mixing process can be performed with or without milling media. The resulting product is heated to 80° C. in an oven for 2 hours to obtain smart particles having antimicrobial and hydrophobic properties.

The 3-(trihydroxystlyl)propyldimethyloctadecyl ammonium chloride is an antimicrobial agent that renders the surface of the particle inherently antimicrobial. In addition, the surface also becomes highly water repellent. To increase hydrophobicity, the coated particles can also be co-reacted with tridecafluorooctyltriethoxysilane or hexadecyltrimethoxysilane to create both an inherently antimicrobial and hydrophobic surface.

The complex formed by reaction between benzisothiazolinone and N,N-didecyl-N,N-dimethylammonium carbonate is the component that acts as the release trigger for the interior antimicrobial agent. The weak bond between negatively charged benzisothiazolinone and positively charged N,N-didecyl-N,N-dimethylammonium carbonate can be broken by temperature and pH.

Example 3—Preparation of Hydrophobic, Anticorrosive and Antimicrobial Smart Particles Solution 1: 7.5 g 1,3,4-thiadiazole-2,5-dithiol (an anticorrosion agent) is dissolved into 209.5 g of ammonium hydroxide solution (15 wt %) in a 200 ml beaker.

Solution 2: 4.2 g of miristalkonium chloride (an antimicrobial agent) is dissolved into 55 g of deionized water on a stir plate at 35° C.

Solution 2 is then added to solution 1 to form a thick, yellow emulsion.

There is no nonfunctional complexing agent used in this example. The complex formed by reaction between the 1,3,4-thiadiazole-2,5-dithiol and the miristalkonium chloride is the trigger component that releases the antimicrobial and anticorrosion components from the first particle. In this regard, the functional agents that form the first part can be considered as self-complexing.

The structural agent of 45 g of tetraethyl orthosilicate is added to the thick emulsion under stirring at 600 rpm. Thereafter, 45 g of citric acid is dissolved in 20 g of deionized water and added to the emulsion solution until the pH is within the range of 8-9. The reaction is allowed to continue at room temperature for 12 hours under stirring.

Products are separated by centrifuging and washed by deionized water twice and dried at room temperature. The dried products are milled in a mill to get a fine powder of smart core particles.

These smart core particles are modified by adding 0.5 g of hexadecyltrimethoxysilane to the dried sample and mixing in a planetary centrifugal mixer at 1000 rpm for 1.0 minutes, with or without milling media. The sample is then heated to 30° C. in an oven for 2 hours to obtain the final product of particulate additives having anticorrosion, antimicrobial, and hydrophobic properties.

Example 4—Preparation of Hydrophobic and Anticorrosive Smart Particles 45 g of potassium nitrite ($KNO_2$) is added into 1800 ml of deionized water in a 2000 ml beaker. 25 g of cetyltrimethylammonium bromide surfactant is added on a stir plate and heated to 35° C. to dissolve all the solids. After the solution becomes clear, the heat is turned off. The solution is cooled to room temperature.

250 g of tetraethyl orthosilicate is added to the cooled mixture under stirring at 600 rpm. Thereafter, 25 g of ammonium hydroxide containing 17.5% ammonia by mass is diluted in 60 g of deionized water to prepare ammonium hydroxide solution. Ammonium hydroxide solution is dropped in the emulsion solution until pH value is around 9. The reaction is performed at room temperature for 12 hours under stirring to obtain core particles with anticorrosion properties. During the reaction, the pH decreases to 7.

Core particle solids in the beaker are separated by centrifuging, sized by passing the solids across a sieve of 25-micron mesh, and washed twice with deionized water. The resulting solids are dried at room temperature or in the oven at 50° C. for 48 hours.

The dried core particles are contacted with 0.5 g tridecafluorooctyltriethoxysilane or hexadecyltrimethoxysilane diluted in 20 g mineral spirit. The resulting hydrophobic anticorrosion smart particles are then ball milled at room temperature in a ball miller.

Analysis with a scanning electron microscope for the resulting smart particles show a spherical morphology and a size of 200 nm on average.

Example 5—Powder Coating Composition

The dual function smart particles of example 4 were added in an amount of 2.0 wt % by dry mixing to a commercially available powder coating without solvent. The resulting enhanced powder paint was electrostatically sprayed onto cold rolled steel panels which were then aged in the oven at 200° C. for 20 minutes.

The coated panels were then tested for hydrophobicity. A sample panel was partially immersed in water. The immersed section showed a silver sheen which appears when air is trapped between the coating and water thereby suggesting a superhydrophobic coating.

Other samples of the enhanced powder-coated panels were then scribed and immersed in saltwater for 576 h (24 days), 1080 h (45 days) and 2000h (83 days).

The control samples having powder coatings without the dual function smart particles of the invention showed scribe rust less than 24 h after immersion and continued to rust throughout the test. In contrast, panels with the same powder coating material but with 2.5 wt % of the non-hydrophobic smart particles did not develop scribe rust until 260 h into the test, and the extent of corrosion remained significantly lower even after 1000 h, demonstrating the efficacy of the corrosion triggered inhibitor release.

The coatings with 1.5 wt % of the present smart particles began developing scribe rust after 450 h of immersion, showing that the combination of hydrophobicity and corrosion-triggered inhibitor release results in higher performance.

The 2.0 wt % and 2.5 wt % coatings did not show any signs of corrosion at the scribed area even after 2000 h of saltwater immersion. This demonstrates that the hydrophobicity is not just a visual effect but improves the overall corrosion protection performance of the coatings, particularly when combined with triggered corrosion inhibitor release.

Example 6—Oil-Based Alkyd Coating Composition

SSPC SP-10 blasted CRS panels were coated with an oil-based alkyd primer and topcoated with a waterborne 1K acrylic clearcoat with final coating thicknesses of 3-4.5 mils. ASTM B117 salt fog testing was performed on the oil-based alkyd.

The control coating was the unchanged alkyd coating. Sample 1 was the alkyd coating with an added corrosion inhibitor compound. Sample 2 included monofunctional core particles having an anticorrosion inhibitor. Sample 3 included the present multifunctional smart particle having hydrophobic and anticorrosion functions. All coatings were cured to manufacturer specifications.

The panels were scribed using a 0.5 mm blade precision knife and subjected to the ASTM B117 salt spray test in a Dongguan Kedi Instruments KD-90 Salt Fog Chamber. comparisons of corrosion development and extent were done at 116 hours (7 days), 287 hours (12 days), 477 hours (20 days), and 718 hours (30 days).

In every case, sample 4 outperformed the other samples. See Table 6.

TABLE 6

Corrosion Resistance Results

Scribe Rust Severity-scale of 0 (severe corrosion)-10 (no corrosion) as per ASTM D1654

| Time (hrs) | Sample 1 (Control) | Sample 2 | Sample 3 | Sample 4 (Invention) |
|---|---|---|---|---|
| 166 | 6 | 7 | 8 | 10 |
| 287 | 0 | 5 | 5 | 9 |
| 477 | 0 | 5 | 1 | 6 |
| 718 | 0 | 1 | 2 | 4 |

Example 7—Preparation of Hydrophobic and Anticorrosive Smart Particles

In a 200 ml beaker, 5.1 g benzotriazole (BTA) is dissolved into 105.6 g of 15 wt % ammonium hydroxide solution at 30° C. In a separate beaker, 2.2 g of hexadecyltrimethylammonium bromide (CTAB), that is a complexing agent, is dissolved into 30 g of water at 30° C. The CTAB solution is added into BTA solution. The mixture becomes white and cloudy from the formation of the desired dissociable complexes suspended in solution and is cooled to room temperature.

45 g of tetraethyl orthosilicate solution is then added into the suspension without preliminary solids separation under stirring at 600 rpm. Thereafter, 28.5 g citric acid is diluted in 20 g of water to prepare a citric acid solution. The citric acid solution is added into the emulsion until the pH value is around 8-9. The emulsion is left to react at room temperature for 12 hours tinder stirring to form a dispersion of dissociable complexes entrapped within pores of a porous silica matrix.

Then, 0.5 g of tridecafluorooctyltriethoxysilane or hexadecyltrimethoxysilane is added into the dispersion and stirred for another 4 hours to obtain dual function smart particles according to the invention that exhibit superhydrophobic and anticorrosion functions.

The products are separated by centrifuging, washed with deionized water twice, and dried at room temperature. The dried products are milled in a mill to obtain a fine powder of 500-5000 nm in size if desired, jet milling or other similar techniques can be used for size reduction and control over size diversity.

Example 8—Preparation of Hydrophobic and Antimicrobial Smart Particles

Benzisothiazolinone is both a complexing agent and an antimicrobial agent. 1.5 g of benzisothiazolinone was dissolved in 1.5 g of Triton-100X (a non-ionic surfactant from Aldrich that is made of t-octylphenoxypolyethoxyethanol, polyethylene glycol tert-octylphenyl ether) on a stirring plate at room temperature.

Another antimicrobial agent, N,N-didecyl-N,N-dimethylammonium carbonate, is added into the benzisothiazolinone solution followed by the addition of 20 g water.

After stirring for 30 minutes to form the suspended complexes, 2.0 g of tetramethylorthosilicate is added to the suspension and stirred at 600 rpm for 30 minutes at room temperature to form the core particles of antimicrobial agent complex within a porous silica matrix.

The core particles are separated by centrifuging, sized through a 25-micron mesh, and washed twice with an ammonia solution. The core particles are dried the room temperature.

3-(trihydroxysilyl)propyldimethyloctadecyl ammonium chloride is a water-repellent agent and an antimicrobial agent. 0.5 g of this agent were added to the dried sample and mixed in a planetary centrifugal mixer at 1000 rpm for 10 minutes with milling media to contact the outer surfaces of the core particles with the hydrophobic-antimicrobial agent. (The use of milling media is optional and not require.) Then, the sample is heated to 80° C. in an oven for 2 hours to enhance reactions between reactive sites on the outer surface of the core particle and obtain smart particles according to the invention having superhydrophobic and antimicrobial properties.

The resulting smart particles were then tested for efficacy. Half of a petri dish containing agar contained 2 wt % of the superhydrophobic antimicrobial smart particles. The other half was the control and had no added agents. Both halves were exposed to E. coli. The agar portion containing the dual function smart particles of the invention did not form a colony.

Example 9 Preparation of Hydrophobic, Anticorrosive and Antimicrobial Smart Particles 7.5 g 1,3,4-thiadiazole-2,5-dithiol (DMTD, a complexing agent) is added into 209.5 g of ammonium hydroxide solution (15 wt %) in a 200 ml beaker.

4.2 g of miristalkonium chloride (antimicrobial agent) is dissolved in deionized water 55 g on a stir plate at 35° C.

The miristalkonium chloride solution is then added into the DMTD solution where a thick, yellow emulsion is formed reflecting the formation of dissociable antimicrobial complexes.

45 g of tetraethyl orthosilicate was added to the suspended complex mixture with stirring at 600 rpm. Thereafter, 45 g citric acid is dissolved in 20 g of deionized water to prepare citric acid solution and then this solution is added in the emulsion solution until pH value is within the range of 8-9. The reaction is allowed to continue at room temperature for 12 hours under stirring to form core smart particles having an antimicrobial complex within the pores of a porous silica matrix.

The smart particles are separated by centrifuging, washed with deionized water twice, and dried at room temperature. The dried smart particles are milled in a mill to a fine powder.

0.5 g of hexadecyltrimethoxysilane (hydrophobic agent) is added into the dried sample and mixed in a planetary centrifugal mixer at 1000 rpm for 10 minutes with milling media. The sample is then heated at 80° C. in an oven for 2 hours to allow the hydrophobic agent to react with exposed, reactive sites on the exterior of the core particles.

Example 10 Preparation of Hydrophobic, Anticorrosive and Antimicrobial Smart Particles 3.6 g of N,N-didecyl-N,N-dimethylammonium carbonate (antimicrobial agent) is added into 40 g of ammonium hydroxide containing 17.5 wt % ammonia is diluted in 39.8 g of deionized water to prepare ammonium. hydroxide solution in a 100 ml beaker to obtain solution A. 1.5 g of benzotriazole (anticorrosion agent) is added into another beaker to get solution B. Solution A is added into solution B. After stirring for 30 minutes, 2.0 g of tetramethylorthosilicate is added in above mixture under stirring at 600 rpm. The reaction is performed at room temperature for 30 minutes with stirring. The particles are separated from the dispersion by centrifugal separation, sieved through a 25-micron mesh, and washed twice with an ammonia solution to obtain core particles having smart, anti-microbial release effects.

The resulting core particles are contacted with 0.5 g hexadecyltrimethoxysilane (hydrophobic agent) that has been diluted in 20 ml mineral spirits for 5 minutes under stirring and 30 hours without stirring at room temperature to modify at least a portion of the reactive sites on the outside of the core particles. The resulting hydrophobic, antimicrobial smart particles are then dried and milled to a size suitable for use as a coating additive.

Example 11—Preparation of Hydrophobic, Anticorrosion and Antimicrobial Smart Particles 45 g of potassium nitrite is added into 1800 ml of deionized water in a 2000 ml beaker on a stir plate at 35° C. 25 g of Uniquat J™ (an antimicrobial agent made of miristalkonium chloride manufactured by Lonza Group AG) is added thereto and stirred until a clear emulsion is formed. The heat is then turned off so the resulting emulsion can cool to room temperature.

250 g of tetraethyl orthosilicate is added under stirring at 600 rpm. Thereafter, 25 g of ammonium hydroxide containing 17.5% ammonia by mass is diluted in 60 g of deionized water which is added to the emulsion solution until pH value is around 9. The matrix-forming reaction is performed at room temperature for 12 hours under stirring. Then, 2.5 g 3-(Trihydroxysilyl)propyldimethyloctadecyl ammonium chloride is added into the dispersion and stirred for an additional four hours to obtain superhydrophobic, anticorrosive and antimicrobial Smart Particles.

Products are separated by centrifuging and washed twice with ammonia and dried at room temperature. The dried products are milled in a mill to get a fine powder.

Example 12—Preparation of Hydrophobic and Antimicrobial Smart Particles 4.1 g cupric oxalate is added into 40 g of ammonium hydroxide solution containing 17.5% ammonia with a pH value of about 12.

5.2 g of cetyltrimethylammonium bromide (surfactant and antimicrobial agent) is dissolved in water on a stir plate at 35° C. and then allowed to cool to room temperature.

The cetyltrimethylammonium bromide solution is then added to the cupric oxalate solution. After 30 minutes of stirring, a stable emulsion is formed.

25 g of tetraethyl orthosilicate is added and stirred at 600 rpm. The matrix-forming reaction is allowed to continue at room temperature for 12 hours under stirring to form the smart core particles.

Then, 2.5 g 3-(trihydroxysilyl)propyldimethyloctadecyl ammonium chloride (an antimicrobial) is added into the smart core particles mixture and stirred for 4 hours to allow time for the surface modification of the core particles with the 3-(Trihydroxysilyl)propyldimethyloctadecyl ammonium chloride. The products are separated by centrifuging, washed with ammonia twice, and dried at room temperature. The dried products are then ground in a grinder to obtain a fine powder.

The disclosures of all US patents that are cited or referred to herein are hereby incorporated by reference.

What is claimed is:

1. A process for making multifunctional smart particles that comprises:
   combining a corrosion inhibitor compound or antimicrobial compound with a complexing agent in aqueous solution to form dissociable complexes having a size within the range of 50-500 nm and that are suspended within said solution;
   adding to the suspension of dissociable complexes a matrix-forming structural agent and allowing the matrix to form porous matrix solids around the dissociable complexes to form smart core particles of dissociable complexes dispersed throughout pores in said matrix, said smart core particles having exterior surfaces; and
   contacting the smart core particles with a functional surface modification agent selected from the group of hydrophobic agents and/or antimicrobial agents and allowing the surface modification agent to react with at least a portion of the smart core particle exterior surfaces and thereby impart hydrophobic and/or antimicrobial effects to the resulting smart particle.

2. A process according to claim 1 wherein said dissociable complex is made with: (a) benzotriazole or benzotriazole-methanol, and hexadecyltrimethylammonium bromide; (b) N-(2,4,6-trichlorophenyl) maleimide, benzisothiazoline and didecyldimethylammonium carbonate; (c) 1,3,4-thiadiazole-2,5-dithiol and hexadecyltrimethylammonium bromide; (d) lithium, sodium or potassium nitrite, and hexadecyltrimethylammonium bromide; (e) lithium, sodium or potassium molybdate, and hexadecyltrimethylammonium bromide; and (f) polyacrylic acid and didecyldimethylammonium carbonate.

3. A process according to claim 1 wherein the outer surface of the smart core particles have been modified by reaction with 0.1-30 wt % of:
   (a) a hydrophobic compound comprising tridecafluorooctyltrichlorosilane, tridecafluorooctyltrimethoxysilane, tridecafluorooctyltriethoxysilane, hexadecyltrichlorosilane, hexadecyltrimethoxysilane, or hexadecyltriethoxysilane; or
   (b) a compound having antimicrobial and hydrophobic properties comprising 3-(trihydroxysilyl)propyldimethyloctadecyl ammonium chloride.

4. The process of claim 1 wherein the dissociable complexes have an average size of 50 nm to 500 nm.

5. The process of claim 1 further comprising adding said smart core particles to a film-forming composition that comprises a paint or powder.

6. The process of claim 1 wherein the dissociable complexes are made from a micelle, vesicle, or emulsion.

7. The process of claim 1 wherein said complexing agent comprises an anionic surfactant, anionic polymer, nonionic surfactant, amphoteric surfactant, cationic surfactant, cationic polymer, quaternary ammonium surfactant, or a biosurfactant.

8. A process according to claim 1 wherein said dissociable complex is made with:
   (a) benzotriazole and hexadecyltrimethylammonium bromide;
   (b) benzotriazole-methanol and hexadecyltrimethylammonium bromide;
   (c) N-(2,4,6-trichlorophenyl) maleimide, benzisothiazoline, and didecyldimethylammonium carbonate;
   (d) 1,3,4-thiadiazole-2,5-dithiol and hexadecyltrimethylammonium bromide;

(e) lithium, sodium or potassium nitrite, and hexadecyltrimethylammonium bromide;

(f) lithium, sodium or potassium molybdate, and hexadecyltrimethylammonium bromide; or (g) polyacrylic acid and didecyldimethylammonium carbonate.

9. A process according to claim 1 that forms a multifunctional smart particle composition which comprises:

core particles comprising dissociable complexes that are within a porous structural matrix at least a portion of whose outer surface has been modified with a hydrophobic compound or an antimicrobial compound;

wherein said dissociable complexes comprise: (i) a first functional agent; and (ii) a second functional agent that interact to form weakly-bonded complexes comprising non-covalent electrostatic interactions;

wherein at least one of the first functional agent and the second functional agent comprise a corrosion inhibitor, an antimicrobial agent, and/or a complexing agent;

wherein the first functional agent and the second functional agent are attracted to one another in the weakly-bonded complexes so that a local pH change near said core particles breaks the attraction therebetween and releases the first and second functional agents from said complex.

10. The process of claim 1 wherein the dissociable complex was made from a micelle, vesicle, or emulsion.

11. The process of claim 1 wherein said complexing agent comprises an anionic surfactant, anionic polymer, nonionic surfactant, amphoteric surfactant, cationic surfactant, cationic polymer, quaternary ammonium surfactant, or a biosurfactant.

12. The process of claim 11 wherein said complexing agent comprises hexadecyltrimethylammonium bromide, polyacrylic acid, sodium dodecyl sulfate, didecyldimethylammonium carbonate, polydiallyldimethylammonium chloride, or sodium 2-mercaptobenzothiazole.

13. A process according to claim 1 that forms dissociable complexes that comprise:

(a) benzotriazole or benzotriazole-methanol, and hexadecyltrimethylammonium bromide;

(b) benzisothiazoline and didecyldimethylammonium carbonate;

(c) 1,3,4-thiadiazole-2,5-dithiol and hexadecyltrimethylammonium bromide;

(d) lithium, sodium, or potassium nitrite, and hexadecyltrimethylammonium bromide;

(e) lithium, sodium, or potassium molybdate, and hexadecyltrimethylammonium bromide; or (f) polyacrylic acid and didecyldimethylammonium carbonate.

14. A process according to claim 9 wherein said matrix comprises silica.

15. A process according to claim 1 wherein at least a portion of the particle exterior surfaces has been modified by reaction with 0.1-30 wt % of a hydrophobic and/or antimicrobial compound.

16. A process according to claim 15 wherein the particle exterior surfaces have been modified by reaction with tridecafluorooctyltrichlorosilane, tridecafluorooctyltrimethoxysilane, tridecafluorooctyltriethoxysilane, hexadecyltrichlorosilane, hexadecyltrimethoxysilane, or hexadecyltriethoxysilane, or 3-(trihydroxysilyl)propyldimethyloctadecyl ammonium chloride.

17. A process according to claim 15 wherein the outer surface of the core particles have been modified by reaction with 0.1-20 wt % of a hydrophobic compound.

18. A process according to claim 15 wherein the outer surface of the matrix has been modified by reaction with 0.1-20 wt % of an antimicrobial compound.

19. A process according to claim 15 wherein the outer surface of the matrix has been modified by reaction with 0.1-20 wt % of an agent having both hydrophobic and antimicrobial properties.

* * * * *